Figure 1:
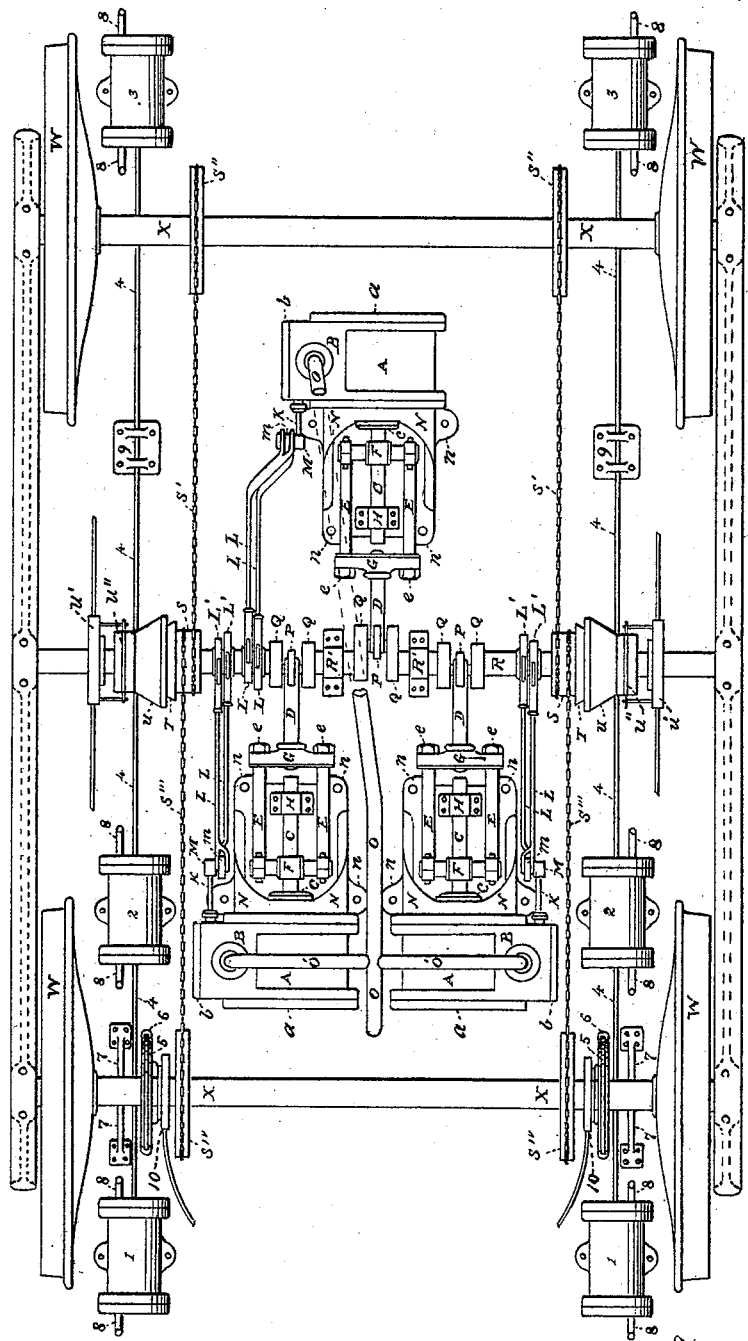

(No Model.)  2 Sheets—Sheet 1.

W. CREELY.
COMPRESSED AIR MOTOR FOR STREET CAR PROPULSION.

No. 534,711.  Patented Feb. 26, 1895.

Witnesses
L. M. Sanders
J. H. Godfrey

Inventor
William Creely
Per John A. Gregg
Attorney

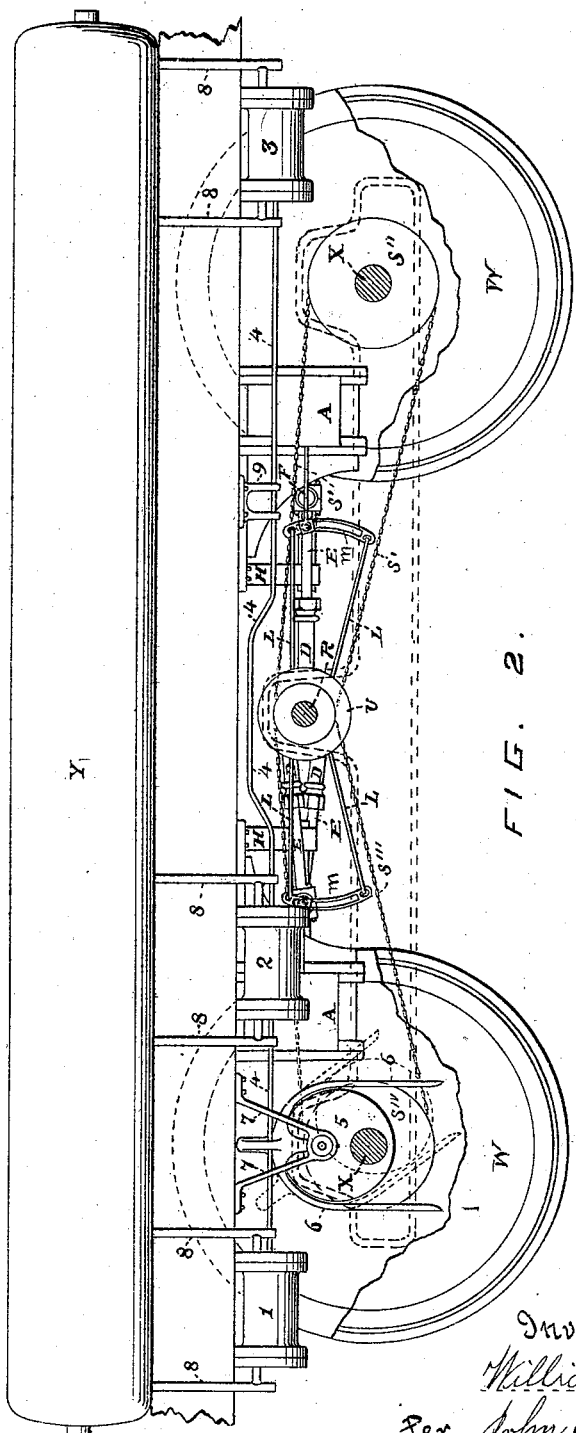

UNITED STATES PATENT OFFICE.

WILLIAM CREELY, OF BAY CITY, MICHIGAN.

COMPRESSED-AIR MOTOR FOR STREET-CAR PROPULSION.

SPECIFICATION forming part of Letters Patent No. 534,711, dated February 26, 1895.

Application filed April 6, 1894. Serial No. 506,621. (No model.)

*To all whom it may concern:*

Be it known that I, WILLIAM CREELY, a citizen of the United States, residing at Bay City, county of Bay, and State of Michigan, have invented new and useful Improvements in Compressed-Air Motors for Street-Car Propulsion, of which the following is a specification.

My invention relates to improvements in motors for propulsion of street cars wherein compressed air is used as the prime motive power so controlled and operated by the mechanisms and devices hereinafter described as to be easily handled, perfectly automatic, simple in construction and economical and durable in operation.

The object of this invention is as follows: To provide auxiliary means for storing energy due to the momentum of the car when on down grade, or when the other driving mechanism of the car is temporarily inoperative, by means of a plurality of air pumps secured to the car frame, and operated by the mechanism of the car. The object is attained by the mechanism illustrated in the accompanying drawings, in which—

Figure I is a plan view of the under side of the car trucks showing the propelling engines and pumping cylinders in their respective positions. Fig. II is a side elevation with the car wheels broken away to show parts in position.

To these ends my invention consists in certain peculiar features of construction and novel combinations of devices in a compressed air motor for street car propulsion as hereinafter more particularly described and claimed.

Referring to the drawings, A. A. A. designate the three driving cylinders all of the same dimensions.

B. B. B. designate the valve chests containing common slide or other suitable valves for admitting air or other fluid pressure alternately to each end of the cylinders A. A. A.

C. C. C. designate the piston rods which reciprocate in cylinders the outer extremities being supported by the guide bracket H.

D. D. D. are short connecting rods connecting the cross-pieces G. G. G. with the cranks Q. Q. Q.

E. E. E. are side rods connecting the cross pieces G. G. G. with the cross heads F. F. F. The rods D. D. D and E. E. E. are rigidly connected to the cross pieces G. G. G. in any suitable manner as by means of the nuts e. e. e.

K. K. K. are valve stems connected to the links m. m. m. by means of the sliding blocks M. M. M. in the usual manner.

L. L. L. L. L. L. are the eccentric connecting rods connecting the links m. m. m. with the eccentric L'. L'. L'. L'. L'. L'., the entire arrangement being the usual method adopted in link motions for reversing gears.

N. N. N. are any suitable frames for supporting the cylinders A. A. A.

O. O. O. O'. O'. O'. are air pipes conducting the air under pressure to the three cylinders from the air tank Y.

P. P. P are the connections between the connecting rods D. D. D. and the double cranks Q. Q. Q. of the driving shaft R. R. R. R'. R'. R'. are bracket bearings for the shaft R. R. R.

S. S. are sprocket wheels running loosely upon shaft R. R. made integral with the male part of the clutches T. T.

S''. S''. S$^{iv}$ S$^{iv}$ are sprocket wheels rigidly attached to the car axles X. X.

S'. S'. S'''. S'''. are sprocket chains connecting the sprocket wheels S. S. with the sprocket wheels S''. S''. and S$^{iv}$ S$^{iv}$.

U. U. are female parts of the clutches of which T. T. are the male parts and are feathered to the shaft R. R.

U' U' represent loose collars, placed on shaft R R R, with prongs provided thereon, for the purpose of working in grooves formed in the female clutch as shown at U'' U'' for the purpose of throwing the driving mechanism in and out of gear.

W. W. W. W. are the car wheels.

X. X. X. X. are the car axles.

I do not confine myself to any particular method of construction of parts as any of the well known types of reversible reciprocating engines which transform the reciprocating motion of a pressure driven piston into the rotary motion of a revolving shaft will answer my purpose fully as well as the devices described.

I will now proceed to describe the storage pumps.

1. 2. 3. 1. 2. 3. are six pump cylinders placed in sets of three on opposite sides of the car and rigidly attached to the car trucks.

4. 4. are piston rods running from cylinders 1 and 3 directly through the cylinders 2. 2. In each cylinder 1. 2. 3. 1. 2. 3. are pistons rigidly attached to and driven by the piston rods 4. 4.

5. 5 are eccentrics running loosely upon one of the car axles X. X. which are caused to revolve with the axle by means of the clutches 10. 10.

6. 6. are yokes or eccentric straps which are caused to oscillate by means of the rotation of the eccentrics 5. 5. when clutched to the axle.

7. 7. are suitable brackets to which the yoke or eccentric straps 6. 6. are pivotally connected.

8. 8. 8. 8. 8. 8. are pipes leading from each pump cylinder head to the compressed air tank Y. shown in Fig. 2. Each of these pipes is provided with two check valves one which serves to admit air from without into the cylinder when the piston in that cylinder is receding from the cylinder head to which the said pipe is attached; the other opening to allow the air to be forced into the tank Y. when the said piston is approaching the cylinder head.

9. is a bracket for supporting and guiding the piston rod 4. at a point midway between cylinders 2 and 3 where it is likely to sag from its own weight.

I will now proceed to describe the action of the combination of devices. At any desired place or places along the line of the street railway track there is placed one or more pumping stations where the air tank Y. is charged with a supply of air to any desired pressure. To start the engines in operation and consequently to propel the car the operator will open a valve in the pipe O leading from air tank Y. to the cylinders A. A. A admitting pressure from the said air tank through the pipe O. O'. to the valve chests B. B. B. thence into the cylinders A. A. A. the reversing links being set to drive the engines in desired direction, the entire mechanism of the cylinders operating in the same manner as the common reciprocating engines fed by fluid pressure. The purpose of the pumping cylinders 1. 2. 3. 1. 2. 3. located upon the sides of the trucks is to restore in so far as they are capable to do so the pressure in the tank Y. at such times as the car has momentum and the cylinders A. A. A are inoperative. Such occasions will occur for instance on down grades where gravity alone would be more than sufficient to carry the car to the bottom of the grade. The surplus energy consequent upon the momentum of the car will then be stored by the pumps as compressed air in the tank Y. with which each pump communicates by means of the pipes 8. 8. 8. 8. 8. 8., or again when it is necessary to check the speed of a rapidly moving car. The air pressure is first cut off from the cylinders and the main driving shaft is thrown out of gear with car axles by means of the clutches T. U. T. U. thus leaving the axles free to move by themselves so far as the engines are concerned. The momentum of the car is then stored as energy in the compressed air by means of the pumps 1. 2. 3. 1. 2. 3. and the method of operation is as follows: At the instant of closing off the pressure from the engine cylinders the clutches 10. 10. upon the axle X are thrown into gear with the eccentric 5 causing the said eccentric to revolve with the axle and thus cause the yoke or strap 6. to oscillate and communicate its motion to the piston rods 4. 4. whereby the pistons are caused to reciprocate and alternately draw in air from without through and past the check valve Z and then force the said air through the valve Z' and pipe 8 into the air tank Y. When the car is at the bottom of a grade or when the motion of the car is sufficiently checked and it becomes necessary to increase its speed the eccentrics 5. 5 are thrown out of gear whereupon the pumps cease action and pressure is again admitted to the engine cylinders first throwing them into gear with the sprockets S. S. S'' S'' $S^{iv}$ $S^{iv}$. by means of the clutches T. U. T. U.

What I claim as my invention, and desire to secure by Letters Patent, is—

1. In a compressed air motor for street car propulsion the combination of an air storage tank supplying air to a plurality of reversible driving engines operating a shaft, clutches and sprockets upon said shaft sprocket chains leading to sprockets rigidly fixed upon car axles, a plurality of air pumps conveniently arranged upon the car frame said pumps operated by any suitable device for converting the rotary motion of the car axle into the reciprocating motion of the pump piston, said pumps designed for storing energy of car due to its momentum when going at high speed and energy is not utilized for said car, substantially as and for the purposes set forth.

2. In a compressed air motor for street car propulsion the combination of a compressed air tank for storing compressed air a series of compressed air engines driving a main shaft a series of clutches upon said shaft a series of sprocket wheels upon said shaft a series of sprocket chains leading from the said sprocket wheels to a series of sprocket wheels upon the axles of the car with a series of air pumps conveniently arranged upon the sides of the car trucks said air pumps communicating by means of suitable valves and pipes with the air tank and operated by any suitable means from the revolving car axle as by means of eccentrics oscillating eccentric straps and suitable clutches for throwing the said eccentrics in and out of gear with the revolving car axle, substantially as and for the purposes set forth.

In testimony whereof I hereunto affix my signature in the presence of two witnesses.

WILLIAM CREELY.

Witnesses:
L. M. SANDERS,
FREDRICK P. SEPONTER.